United States Patent [19]

Liu et al.

[11] Patent Number: 4,609,592

[45] Date of Patent: Sep. 2, 1986

[54] MULTILAYERED STRUCTURE

[75] Inventors: Ping Y. Liu, Naperville, Ill.; Robert P. Hirt, Jr., Lenox, Mass.

[73] Assignee: General Electric Company, Mt. Vernon, Ind.

[21] Appl. No.: 722,844

[22] Filed: Apr. 12, 1985

[51] Int. Cl.[4] ............................................. B32B 27/36
[52] U.S. Cl. ................................. 428/412; 428/473.5; 428/35; 428/474.4; 428/480; 428/483; 524/736; 525/92; 264/176 R
[58] Field of Search .................. 428/412, 473.5, 474.4

[56] References Cited

U.S. PATENT DOCUMENTS 4,024,101  5/1977  Takekoshi et al. ............. 428/458 X
4,540,623  9/1985  Im et al. ........................ 428/412 X

FOREIGN PATENT DOCUMENTS 3326392  1/1985  Fed. Rep. of Germany ...... 428/412
0072780  6/1977  Japan ................................. 428/412

*Primary Examiner*—P. C. Ives
*Attorney, Agent, or Firm*—Myron B. Kapustij; Martin B. Barancik

[57] ABSTRACT

A multilayered structure comprising (a) at least one layer comprised of at least one aromatic polyether imide resin, and (b) at least one layer comprised of a modified aromatic polycarbonate resin containing composition. In the instant structure the layer comprised of the aromatic polyether imide resin is adjacent and to and adhered to the layer comprised of the modified aromatic polycarbonate composition.

18 Claims, No Drawings

MULTILAYERED STRUCTURE

BACKGROUND OF THE INVENTION

Multilayer structures have been utilized for many years. The concept of a multilayer is that the positive properties of two or more different materials are combined with the integrity of each material being essentially uncompromised. Although many of these multilayers can be hypothesized on the basis of laminating a material possessing certain strong properties with a material having strong properties in other areas, certain practical considerations inhibit successful implementation of this theory. The two materials are in intimate contact at their interface. The compatibility of the two resins at this interface is generally not known until actually contacted at the high temperatures necessary to obtain adherence of the two layers. Where incompatibility is significant—the two layers pull apart with little external stressing force—a tie layer that binds the two relatively incompatible layers is necessary. In general, polymers of significantly differing chemical structure are relatively incompatible and require a tie layer for many of the structure's applications.

It has now been discovered that certain polymers with significantly differing chemical structures can be adjacent to each other in a multilayer composition without the benefit of a tie layer. Although not necessary for many applications, a tie layer may be interposed between the two layers for certain applications.

SUMMARY OF THE INVENTION

The instant invention is directed to a multilayer structure comprised of (a) at least one layer comprising a modified aromatic polycarbonate composition, and (b) at least one layer comprising a polyether imide.

DESCRIPTION OF THE INVENTION

In accordance with the instant invention there are provided multilayered structures which comprise (a) at least one layer containing a modified aromatic polycarbonate resin composition, and (b) at least one layer containing an aromatic polyether imide, said layer (a) being immediately adjacent and adhered to said layer (b).

Polyether imides of the type disclosed in Wirth, U.S. Pat. No. 3,787,364 and Takekoshi, U.S. Pat. No. 4,024,101, both of which are hereby incorporated herein by reference, are useful in the instant invention. Particularly useful polyether imides are those represented by the general formula

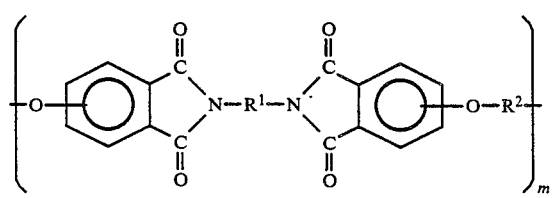 I.

wherein:
  $R^2$ is a divalent aromatic radical containing from 6 to about 20 carbon atoms;
  $R^1$ is a divalent radical which is the organic residue of a diamine reacted with a nitro-substituted anhydride; and
  m is an integer having a value of from 2 to about 5,000, preferably from 10 to about 5,000.

In Formula I $R^2$ is preferably selected from phenylene, lower alkylphenylene, naphthylene, biphenylene and

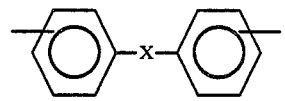

where X is selected from divalent aliphatic hydrocarbon radicals containing from 1 to about 8 carbon atoms, divalent cycloaliphatic hydrocarbon radicals containing from 4 to about 8 ring carbon atoms, divalent araliphatic hydrocarbon radicals containig from 7 to about 10 carbon atoms, —O—,

—S—, and —SO$_2$—.

$R^1$ in Formula I is preferably selected from $R^2$, xylylene, an alkylene radical containing from 2 to about 20 carbon atoms, and a cycloalkylene radical containing from 4 to about 8 ring carbon atoms.

Of these compounds the preferred ones are those wherein $R^1$ is phenylene or alkyl substituted phenylene wherein each alkyl substituent contains from 1 to about 3 carbon atoms, the number of alkyl substituents being one to three, and $R^2$ is selected from biphenylene and radicals represented by the general formula

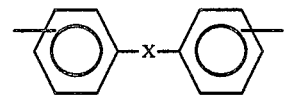

wherein X is selected from alkylene radicals containing from 2 to about 8 carbon atoms, alkylidene radicals containing from 1 to about 8 carbon atoms, cycloalkylene radicals containing from 4 to about 8 ring carbon atoms, cycloalkylidene radicals containing from 4 to about 8 carbon atoms, —O—, —C—,

and —SO$_2$—.

The preferred high polymer contains recurring structural units represented by the general formula

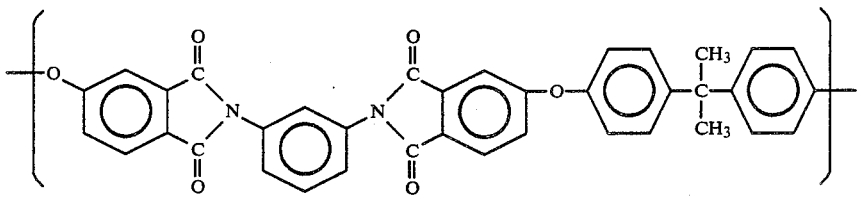

II.

The organic portion of the specific diamino compound, $R^1$, which can be employed in the preparation of the aromatic polyether imides are illustratively exemplified as the diamines at column 3, lines 10–47 of U.S. Pat. No. 3,787,364. The specific dihydric phenols which provide the phenylene portion, $R^2$, of the aromatic polyether imide are illustratively exemplified at column 4, lines 8–56 of U.S. Pat. No. 3,787,365.

The number of carbon atoms, maximum, to be used in the various alkylene, alkylidene, cycloalkyl, cycloalkylidene, cycloalkylene, etc. groups is eight carbon atoms, inclusive, unless otherwise specified.

The modified polycarbonate resin composition forming the layer adjacent to the aromatic polyether imide containing layer is comprised of, in admixture:

(i) a high molecular weight thermoplastic aromatic polycarbonate resin;

(ii) at least one compound comprised of a selectively hydrogenated linear, sequential or radial teleblock copolymer of a vinyl aromatic compound $(A)_n$ and $(A')_n$ and an olefinic elastomer (B) of the type A-B-A', A-(B-A-B)$_b$-A, $A(BA)_nB$, $(A)_4B$, $B(A)_4$, or $B((AB)_nB)_4$, wherein n is an integer of from 1 to 10; and (iii) an olefin-rubbery diene terpolymer.

The high molecular weight aromatic thermoplastic polycarbonates which comprise one, and generally the major, component of these compositions are known materials which may be readily prepared by a variety of known processes such as, for example, the interfacial polymerization process, the transesterification process, the melt polymerization and solution polymerization process, etc. These polycarbonates., as well as methods for their preparation, are disclosed, inter alia, in U.S. Pat. Nos. 2,999,835, 3,028,365, 3,275,601, 3,334,154, and 3,989,672, all of which are hereby incorporated herein by reference.

A particularly useful process for the preparation of the polycarbonates useful in the instant invention is the interfacial polymerization process involving the reaction of at least one dihydric phenol with a carbonate precursor in the presence of an aqueous caustic solution, a water immiscible organic solvent such as methylene chloride, a catalyst, and a molecular weight regulator.

Typical of some of the dihydric phenols which may be employed in the preparation of the instant polycarbonates are 2,2-bis(4-hydroxyphenyl)propane (bisphenol-A), 1,1-bis(4-hydroxyphenyl)propane, 1,5-bis (4-hydroxyphenyl)pentane, 1,1-bis(4-hydroxyphenyl) cyclohexane, 2,2-bis(3,5-dimethyl-4-hydroxyphenyl) propane, 2,2-bis(3,5-dibromo-4-hydroxyphenyl)propane, 1,3-bis(4-hydroxyphenyl)propane, 1,1-bis(3-chloro-5methyl-4-hydroxyphenyl)butane, 4,4'-thiodiphenol, bis (4-hydroxyphenyl)ether, p,p'-dihydroxydiphenyl, and bis(3,5-diisopropyl-4-hydroxyphenyl)-sulfone. Other useful dihydric phenols are disclosed in U.S. Pat. Nos. 2,999,835, 3,027,365, 3,334,154, 3,035,021, 3,036,036, 3,036,037, 3,036,039, and 4,111,910, all of which are incorporated herein by reference.

It is, of course, possible to employ a mixture of two or more different dihydric phenols or a copolymer of a dihydric phenol with a glycol or with hydroxy or acid terminated polyester, or with a dibasic acid in the event a carbonate copolymer or interpolymer rather than a homopolymer is desired. Also employed in the practice of this invention may be blends of any of the above materials to provide the aromatic carbonate polymer.

The carbonate precursor may be either a carbonyl halide, a carbonate ester, or a bishaloformate. The carbonyl halides which may be employed herein are carbonyl bromide, carbonyl chloride, and mixtures thereof. Typical carbonate esters which may be employed herein are diphenyl carbonate; di(halophenyl)carbonates such as di(chlorophenyl)carbonate, di(bromophenyl)carbonate, di(trichlorophenyl)carbonate, etc.; di(alkylphenyl)carbonates such as di(tolyl) carbonate, etc., di(naphthyl)carbonate; di(chloronaphthyl)carbonate; phenyl tolyl carbonate; chlorophenyl chloronaphthyl carbonate, etc., or mixtures thereof. The bishaloformates suitable for use herein include the bishaloformates of dihydric phenols such as bischloroformate of hydroquinone, bischloroformate of bisphenol-A, and the like; or bishaloformates of glycols such as the bischloroformate of ethylene glycol, polyethylene glycol, neopentyl glycol, and the like. The preferred carbonate precursor is carbonyl chloride, also known as phosgene.

The catalysts employed in the preparation of the instant polycarbonates can be any of the known materials which initiate the polymerization reaction between the dihydric phenol and the carbonate precursor. These catalysts include, but are not limited to, tertiary amines such as triethylamine, tripropylamine and N, N-dimethyzaniline, quaternary ammonium compounds, and quaternary phosphonium compounds. The molecular weight regulators can be any of the known compounds that control or regulate the molecular weight of the polycarbonate by a chain terminating mechanism. These compounds include, but are not limited to, phenol, tertiarybutyl phenol, chroman-I, and the like.

Particularly useful polycarbonates are those containing recurring structural units represented by the general formula

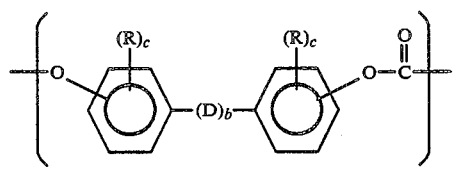

wherein:
R is independently selected from halogen and monovalent hydrocarbon radicals;

D is selected from divalent hydrocarbon radicals,
—O—,

—S—, —S—S—,

and

is either zero or one; and c is independently selected from integers having a value of from 0 to 4 inclusive.

The monovalent hydrocarbon radicals represented by R include the alkyl, cycloalkyl, aryl, aralkyl, and alkaryl radicals. Preferred alkyl radicals are those containing from 1 to about 10 carbon atoms. Preferred cycloalkyl radicals are those containing from 4 to about 8 ring carbon atoms. Preferred aryl radicals are those containing from 6 to 12 ring carbon atoms, i.e., phenyl, biphenyl, and naphthyl. Preferred aralkyl and alkaryl radicals are those containing from 7 to about 14 carbon atoms.

The divalent hydrocarbon radicals represented by D are selected from alkylene, cycloalkylene, alkylidene, and cycloalkylidene radicals. The preferred alkylene radicals are those containing from 2 to about 20 carbon atoms. Preferred alkylidene radicals are those containing from 1 to about 20 carbon atoms. Preferred cycloalkylene and cycloalkylidene radicals are those containing from 4 to about 16 ring carbon atoms.

The instant polycarbonates preferably have a weight average molecular weight of from about 10,000 to about 200,000, preferably from about 20,000 to about 100,000. It is generally preferred that the instant polycarbonates have an intrinsic viscosity at 25° C. in methylene chloride of at least about 0.4 dl/gm.

Also included herein are the randomly branched thermoplastic aromatic polycarbonates which are obtained by the reaction of a dihydric phenol, a carbonate precursor, and a polyfunctional aromatic compound which acts as a branching agent. These polyfunctional aromatic compounds are well known in the art and contain at least three functional groups which may be hydroxyl, carboxyl, carboxylic anhydride, haloformyl, or mixtures thereof. Some illustrative non-limiting examples of these polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic anhydride, and the like.

Also included herein are blends of linear and branched polycarbonates.

Included within the instant definition of polycarbonates are also the copolyester-carbonates. The copolyester-carbonates are polymers derived from a dihydric phenol, a carbonate precursor, and an ester precursor such as a difunctional carboxylic acid or an ester forming reactive derivative thereof. These copolyester-carbonate resins, as well as methods for their are disclosed, inter alia, in U.S Pat. No. 3,169,121, which is hereby incorporated herein by reference.

The selectively hydrogenated linear, sequential or radial teleblock copolymers which comprise the second component of the multicomponent compositions of the instant invention are well known in the art and are generally commercially available or may be readily prepared by known methods.

Prior to hydrogenation the end blocks of these polymers comprise homopolymers of copolymers preferably prepared from alkenyl aromatic hydrocarbons and particularly vinyl aromatic hydrocarbons wherein the aromatic moiety may be either monocyclic or polycyclic. Typical monomers include styrene, alpha-methyl styrene, p-methyl styrene, vinyl xylene, ethyl vinyl xylene, vinyl naphthylene, and the like, or mixtures thereof. The end blocks (A) and (A') may be the same or different. They are preferably selected from styrene, alpha-methyl styrene, vinyl toluene, vinyl xylene, vinyl naphthylene, and especially styrene. The center block (B) may be derived from, for example, butadiene, isoprene, 1,3-pentadiene, 2,3-dimethylbutadiene, and the like, and it may have a linear, sequential or teleradial structure.

The selectively hydrogenated linear block copolymers are described in Haefel et al., U.S. Pat. No. 3,333,024, which is incorporated herein by reference.

The ratio of the copolymers and the average molecular weights can vary broadly, although the molecular weight of the center block should be greater than that of the combined terminal blocks. It is preferred to form terminal block A each having a weight average molecular weight of about 2,000 to about 60,000 and center block B, e.g. a hydrogenated polybutadiene block, with a weight average molecular weight of about 20,000 to 450,000. Still more preferably, the terminal blocks each have a weight average molecular weight of about 7,000 to about 35,000 while the hydrogenated polybutadiene polymer blocks have a weight average molecular weight between about 30,000 and 150,000. The terminal blocks will preferably comprise from about 20 to about 45% by weight, more preferably from about 25 to about 40% by weight of the total block copolymer. The preferred copolymers will be those having a polybutadiene center block wherein from about 35 to about 55% of the butadiene block segment is the structure resulting from 1,2 addition.

The hydrogenated copolymer will have the average unsaturation reduced to less than 20% of the original value. It is preferred to have the unsaturation of the center block B reduced to 10%, or less, preferably 5%, or less, of its original value. After hydrogenation center blocks B derived from isoprene will have the ethylene butylene structure.

The block copolymers are formed by techniques well known to those skilled in the art. Hydrogenation may be conducted utilizing a variety of known hydrogenation catalysts such as nickel on kieselguhr, Raney nickel, copper chromate, molybdenum sulfide and finely divided platinum or other noble metals on a low surface area carrier.

Hydrogenation may be conducted at any desired temperature or pressure, e.g., from atmospheric to about 210 Kg/cm$^2$. The usual range being between 7 and 70 Kg/cm$^2$ at temperatures from 24° C. to 316° C.

for times between 0.1 and 24 hours, preferably from 0.2 to 8 hours.

Hydrogenated block copolymers such as Kraton G-1650 and Kraton G-1651 from Shell Chemical Company, Polymers division, have been found useful in the present invention. Also useful are the Solprenes of Phillips.

The radial teleblock copolymers of which the Solprenes are typical examples can be characterized as having at least three polymer branches with each branch of the radial block polymer comprising terminal non-elastomeric segments, e.g., (A) and (A') as defined hereinafore. The branches of the radical block polymer contain a terminal nonelastomeric segment attached to an elastomeric polymer segment, e.g. (B) as defined hereinafore. These are described in Marrs, U.S. Pat. No. 3,735,936 and in Zelinski, U.S. Pat. No. 3,281,383, both of which are incorporated herein by reference, and they are selectively hydrogenated by well known procedures. In any event, the term "selective hydrogenation" is used herein to contemplate polymers in which the elastomeric blocks (A) and (A') have been left unhydrogenated, i.e. aromatic.

third component of the instant compositions is an olefin-rubbery diene polymer. These olefin-rubbery diene polymers are well known in the art and are generally commercially available or may be readily prepared by known conventional methods. They may, for example, be derived from an olefin and a diene. The olefins which may be utilized in their preparation are any of the known olefins, preferably the lower olefins such as ethylene, propylene, butylene, and the like. The dienes include the well known dienes such as the norbornenes such as ethylidene norbornene, butadiene, pentadiene, isoprene, cyclopentadiene, cyclohexadiene, and the like. Preferred olefin-diene polymers are the terpolymers derived from two olefins and a diene. Particularly useful terpolymers of this type are those of the EPDM family such as ethylene propylene diene terpolymers. Some non-limiting illustrative examples of the EPDM type terpolymers include ethylene propylene norbornene, ethylene propylene ethylidene norbornene, ethylene propylene butadiene, ethylene propylene pentadiene, ethylene propylene cyclohexadiene, and the like. Particularly useful EPDM type terpolymers are ethylene propylene norbornene and ethylene propylene ethylidene norbornene. These EPDM type terpolymers are well known in the art and are generally commercially available, such as EPSYN 704 from Copolymer Rubber, and the VISTALON series from Exxon Chemicals such as VISTALON 3708, VISTALON 2504, and the like.

The amounts of components (ii) and (iii) present in the compositions are amounts which are effective to improve the tear strength and/or impact strength and chemical solvent resistance of the layers fabricated from these modified polycarbonate compositions relative to layers fabricated from polycarbonate alone. Greater than these amounts may be used so long as the properties of these layers desired for a particular application of the multilayered structure of the instant invention are substantially maintained.

Generally a minimum of about 2 weight percent of component (ii) and a minimum of about 1 weight % of component (iii) is sufficient to observe an improvement in the tear strength and/or impact strength, and the chemical solvent resistance, of the layers comprised of the instant modified polycarbonate compositions. A minimum of about 4 weight % of component (ii) and a minimum of about 2 weight % of component (iii) are preferred, while a minimum of about 5 weight % of (ii) and about 3 weight % of (iii) are more preferred. A level of about 30 weight % of component (ii) and about 20 weight % of component (iii) should generally not be exceeded, preferably a level of about 20% by weight of component (ii) and about 15% by weight of component (iii), and more preferably a level of about 15 weight % of component (ii) and about 10 weight % of component (iii). Weight percent is measured as the amounts of components (ii) and (iii) present in the total of components (i), (ii) and (iii). Thus, the compositions from which the modified polycarbonate layer are fabricated generally contain from about 50 to about 97 weight % polycarbonate resin, from about 2 to about 30 weight % component (ii), and from about 1 to about 20 weight % component (iii); preferably from about 65 to about 94 weight % polycarbonate resin, from about 4 to about 20 weight % component (ii), and from about 2 to about 15 weight % of component (iii); and more preferably from about 75 to about 92 weight % polycarbonate resin, from about 5 to about 15 weight % component (ii), and from about 3 to about 10 weight % component (iii).

The layer containing the polyether imide exhibits high heat resistance, high modulus, and good chemical resistance. The layer containing the modified polycarbonate composition exhibits, relative to a layer comprised of unmodified polycarbonate, improved tear strength, improved resistance to chemical solvents and, above the ductile-brittle transition point of polycarbonate which is from about 4.2 mm thickness, improved impact strength. Thus, the multilayer structure of the instant invention exhibits high heat resistance, high modulus, good chemical resistance, good tear strength and/or good impact strength.

The thickness of each layer can vary widely and generally depends on the specific use of the instant multilayer structure. Generally, the polyether imide layer has a thickness of from about 0.05 to about 3.84 mm, preferably from about 0.08 to about 2.55 mm, more preferably from about 0.10 to about 1.28 mm, and most preferably from about 0.13 to about 1.02 mm.

The layers containing the modified polycarbonate composition generally have a thickness of from about 0.05 to about 12.75 mm, preferably from about 0.10 to about 6.38 mm, more preferably from about 0.10 to about 2.55 mm, and most preferably from about 0.13 to about 1,56 mm.

The multilayer composites of the instant invention can contain two or more layers. Thus, for example, the two layer composites contain one layer of polyether imide adjacent and adhered to the layer containing the modified polycarbonate composition (hereinafter referred to as the polycarbonate layer). A three layer structure can be comprised of either two outer polyether imide layers and an internal polycarbonate layer disposed between said two outer polyether imide layers, or two outer polycarbonate layers and an internal polyether imide layer disposed in between said two outer layers. A four layer structure can contain, for example, polyether imide/polycarbonate/polyether imide/polycarbonate. The term "layer" as used herein includes both monolithic structures, i.e., those made of a single ply, or those made of one or more plies of the same type of polymer as for example a layer comprised of two or more plies of polyether imide.

The particular position or arrangement of the various layers in a structure containing three of more layers will depend upon the particular application or use to which the multilayer structure is to be put. Thus for example, if tear strength and/or impact strength is of paramount importance a three layer structure wherein the polycarbonate layers form the two outer layers and the polyether imide forms the inner layer can be used. If high temperature resistance is of paramount importance a three layer structure in which the polyether imide layers form the two outer layers and the polycarbonate layer forms the inner layer can be used. In this manner the high temperature resistant polyether imide would be exposed to the high temperature while the polycarbonate layer would be the internal layer which would be protected, somewhat, from direct exposure to the high temperatures. Even if the inner layer reached its softening point, the outer layers of greater temperature resistance would maintain the shape of the article. Likewise, if resistance to solvents is of paramount importance a three layer structure in which the two polyether imide layers are the outer layers and the polycarbonate layer is the inner layer can be used.

The multilayers are prepared in the usual manner, that is by lamination of separate layers extruded in normal fashion, or more typically by coextrusion through a diehead whereby the layers become intradielaminated. Coinjection molding can also be employed. After the multilayer is prepared, the final article can be prepared by such processes as coldforming, thermoforming, blow molding and other like methods.

The multilayer structures of the instant invention can be used to make trays, containers such as bottles, jars, and the like films, etc.

In preparing the laminates or containers of the instant invention there can be significant loss of the multilayer material. An example of such material is the scrap material prepared when the pinch-off is made in co-extrusion blow molding. A further example of such material is containers of the multilayer material which have outlived their usefulness. These multilayer scrap materials are reground thus forming a blend of their components.

These blends can be injection molded into various parts and utilized wherein aromatic polycarbonate or polyether ixide like materials can be employed.

The composition of these blends will depend upon the multilayer from which they are obtained. Generally, these blends contain from about 5 to about 95 weight percent polyether imide and from about 95 to about 5 weight percent of the modified polycarbonate composition, preferably from about 10 to about 85 weight percent polyether imide and from about 15 to about 90 weight percent modified polycarbonate composition, and more preferably from about 25 to about 75 weight percent polyether imide and from about 75 to about 25 weight percent modified polycarbonate composition. Weight percent is measured as the amount of polyether imide or modified polycarbonate composition present in the total of polyether imide and modified polycarbonate composition present in the blend.

DESCRIPTION OF THE PREFERRED EMBODIMENTS

The following examples are presented to more fully and clearly illustrate the present invention. Although the examples set forth the best mode presently known to practice the invention they are intended to be and should be considered as illustrative of rather than limiting the invention. In the examples all parts and percentages are parts and percentages by weight, unless otherwise specified.

EXAMPLE 1

A modified polycarbonate composition is prepared by physically blending together 87 parts by weight of a bisphenol-A polycarbonate having an intrinsic viscosity in methylene chloride at 25° C. of 0.53, 8 percent by weight of KRATON G-1651, a hydrogenated block copolymer, and 5 percent by weight of VISTALON 3708, a ethylene propylene ethylidene norbornene terpolymer. This modified polycarbonate composition and ULTEM ® resin, the preferred polyetherimide, which is a combination of bisphenol-A dianhydride and m-phenylene diamine having a melt flow rate of 9.0 g/10 minutes±2 measured on an extrusion plastometer at 343.3° C., 6,600 gm mass measured according to ASTM procedure D1238 Method A were extruded in separate extruders at about 5500° C. and about 680° C. respectively and combined in a feedblock adaptor to form a two layer composite of modified polycarbonate/polyetherimide having thicknesses in millimeters of 1.26 and 0.25 respectively.

While two component layers of the extruded structure are discernable, they are not manually peelable.

Although the foregoing example and disclosure have shown various modifications of the present invention, other variations are possible in light of the above teachings. It is, therefore, to be understood that changes may be made in the particular embodiments of the invention described and which are within the full intended scope of the invention as defined by the appended claims.

The modified polycarbonate layer and the polyetherimide layer need not be only adjacent and adhered to each other. Although adjacent to each other, the modified polycarbonate can also be adjacent to a third resin on its other side. Examples of a third resin include 1,4-cyclohexane dimethanol containing polyester such as 1,4-cyclohexane dimethanol residue containing polyester wherein the acid residue is from terephthalic acid or a combination of terephthalic and isophthalic acid as in the KODAR ® series available from Eastman Chemical. Such a three layer would be KODAR ®/modified polycarbonate/polyetherimide. It is also equally clear that the polyetherimide can be adjacent and adhered to a third resin as well, for example a polyamide or polyimide. An example of such a structure is modified polycarbonate/polyetherimide/polyamide.

What is claimed is:

1. A multilayer structure comprising:
   (a) at least one layer comprised of an aromatic polyether imide resin; and
   (b) at least one layer containing a modified aromatic polycarbonate composition comprising
      (i) at least one high molecular weight aromatic thermoplastic polycarbonate resin,
      (ii) at least one selectively hydrogenated linear, sequential or radial teleblock copolymer resin of vinyl aromatic compound (A) and (A') and an olefinic elastomer (B), of the type A-B-A', A-(B-A-B)$_n$-A, A(BA)$_n$B, (A)$_4$B, B(A)$_4$ or B((AB)$_n$B)$_4$, wherein n is an integer having a value of from 1 to 10 inclusive, and
      (iii) at least one ethylene propylene diene terpolymer; wherein said layer (a) is adjacent and adhered to said layer (b).

2. The structure of claim 1 wherein said aromatic polyether imide resin is comprised of recurring structural units represented by the general formula

wherein:
$R^2$ is a divalent aromatic radical containing from 6 to about 20 carbon atoms; and
$R^1$ is selected from $R^2$, xylylene, alkylene containing from 2 to about 20 carbon atoms, and cycloalkylene radicals.

3. The structure of claim 2 wherein $R^2$ is a divalent aromatic radical selected from naphthylene, biphenylene, phenylene, alkylphenylene, and

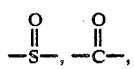

wherein X is selected from divalent aliphatic radicals containing from 1 to about 8 carbon atoms, divalent cycloaliphatic radicals containing from 4 to about 8 carbon atoms, divalent araliphatic radicals containing from 7 to about 10 carbon atoms, —O—, $$-\overset{O}{\underset{}{S}}-, -\overset{O}{\underset{}{C}}-,$$

and

4. The structure of claim 3 wherein $R^1$ is selected from $R^2$, xylylene, alkylene containing from 2 to about 20 carbon atoms, and cycloalkylene radicals containing from 4 to about 8 carbon atoms.

5. The structure of claim 4 wherein said aromatic polyether imide is comprised of recurring structural units represented by the general formula

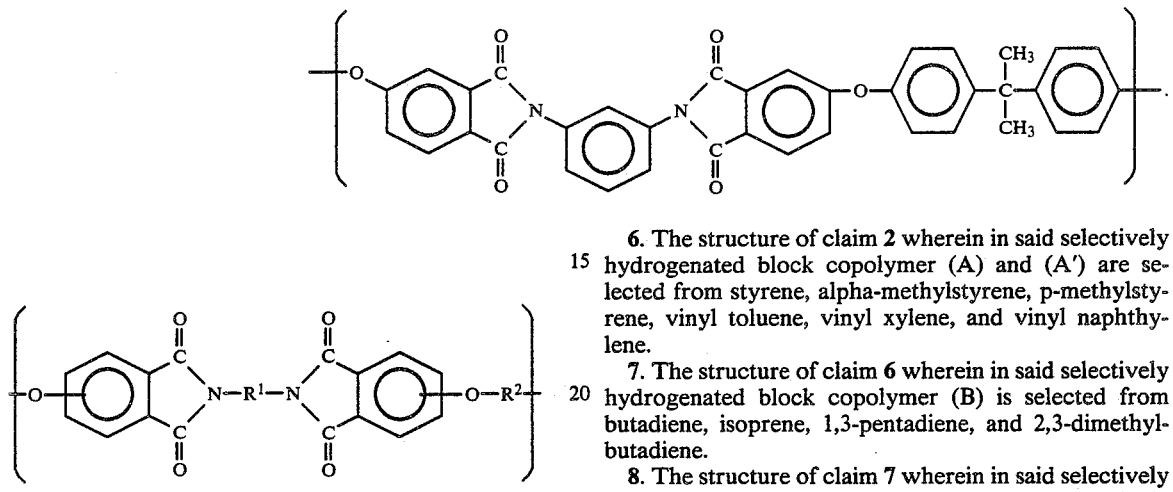

6. The structure of claim 2 wherein in said selectively hydrogenated block copolymer (A) and (A') are selected from styrene, alpha-methylstyrene, p-methylstyrene, vinyl toluene, vinyl xylene, and vinyl naphthylene.

7. The structure of claim 6 wherein in said selectively hydrogenated block copolymer (B) is selected from butadiene, isoprene, 1,3-pentadiene, and 2,3-dimethylbutadiene.

8. The structure of claim 7 wherein in said selectively hydrogenated block copolymer (A) is a styrene block, (B) is a diolefin block, and (A') is a styrene block.

9. The structure of claim 1 wherein said diene is norbornene or a substituted norbornene.

10. The structure of claim 9 wherein said diene is norbornene.

11. The structure of claim 9 wherein said diene is ethylidene norbornene.

12. The structure of claim 2 wherein said polycarbonate is the polymerized reaction product of a carbonate precursor and at least one dihydric phenol.

13. The structure of claim 12 wherein said carbonate precursor is phosgene.

14. The structure of claim 13 wherein said dihydric phenol is bisphenol-A.

15. The structure or claim 12 wherein said modified polycarbonate composition contains from about 50 to about 97 weight percent aromatic polycarbonate resin, from about 2 to about 30 weight percent of said selectively hydrogenated block copolymer, and from about 1 to about 20 weight percent of said olefin-diene terpolymer.

16. The structure of claim 12 which contains one layer of said polyether imide adjacent to and adhered to one layer containing said modified polycarbonate composition.

17. The structure of claim 2 which contains two outer layers comprised of said polyether imide and an intermediate layer comprised of said modified polycarbonate composition disposed between and adhered to said two outer layers.

18. The structure of claim 12 which contains two outer layers comprised of said modified polycarbonate composition and an intermediate layer comprised of said polyether imide disposed between and adhered to said two outer layers.

* * * * *